United States Patent [19]
Ruthrof

[11] 3,747,771
[45] July 24, 1973

[54] DEVICE FOR SEPARATING SOLIDS AND OTHER FOREIGN BODIES FROM LIQUIDS IN A PIPE CONDUIT

[75] Inventor: Klaus Ruthrof, Erlangen Germany

[73] Assignee: Siemens Aktiengesellschaft, Berlin and Munich, Germany

[22] Filed: Dec. 22, 1971

[21] Appl. No.: 210,784

[30] Foreign Application Priority Data
Dec. 24, 1970 Germany.................. P 20 63 891.9

[52] U.S. Cl.................. 210/409, 210/435, 210/446
[51] Int. Cl............................................. B01d 35/02
[58] Field of Search.................... 209/273, 300, 305, 209/306, 380; 210/81, 313, 409, 410, 411, 412, 427, 433, 435, 437, 438, 446

[56] References Cited
UNITED STATES PATENTS
3,063,566  11/1962  Hanley........................... 210/446 X
1,704,634  3/1929   Snider............................ 210/448 X
1,843,242  2/1932   Rafton............................. 210/409
2,658,622  11/1953  Thornhill......................... 210/409
2,760,644  8/1956   Nelson........................... 210/411 X Primary Examiner—Samih N. Zaharna
Assistant Examiner—Robert H. Spitzer
Attorney—Arthur E. Wilfond, Herbert L. Lerner et al.

[57] ABSTRACT

A device for separating solids and other foreign bodies from liquids in a pipe conduit includes a screen mounted in the conduit which is conically tapered in the flow direction. A discharge tube for the separated solids, leading to the outside, is connected at the apex of the screen. A barrier is arranged on outer side of screen which extends perpendicularly to the surface of the screen between the individual rows of holes of the screen.

8 Claims, 6 Drawing Figures

DEVICE FOR SEPARATING SOLIDS AND OTHER FOREIGN BODIES FROM LIQUIDS IN A PIPE CONDUIT

The invention relates to a device for separating solids and other foreign bodies from liquids in a pipe line or pipe conduit. The device includes a screen mounted in the pipe conduit and is conically tapered in the flow direction. A discharge tube for the separated solids leading to the outside is connected at the apex of the conically tapered screen.

With a conically tapered screen of this type, through which the flow passes from the inside to the outside, solids in the liquid to be purified can be held back reliably and can be continuously discharged through the discharge line at the apex of the screen, so that clogging of the screen is avoided. However, difficulties with the discharge of the impurities are encountered if fibrous materials are carried along in the liquid, which settle in the holes formed in the screen and are partly taken along to the outer side of the screen. Cleaning of the screen by the flow is often not possible here because these fibrous materials, which partly hang to the outside through the holes of the screen, become tangled with each other on the outer side of the screen and can therefore not be pulled back inside the screen.

It is therefore an objective of the invention to provide a device for separating solids and other foreign bodies in which clogging and entanglement of fibrous solids are largely avoided.

According to a feature of the invention, barrier means in the form of flange-like members are disposed on the outer side of the screen and extend perpendicularly to the surface of the screen between respective mutually adjacent rows of the holes in a direction transverse to the direction of flow. These barriers interrupt the direct connecting line between two consecutive rows of holes, so that the fibrous materials on the outer side of the screen can no longer get entangled with each other. It is thereby possible to pull back these fibrous materials to the inner side of the screen by means of a suitable additional flow in the interior of the screen and to thereby carry them reliably away.

It is advantageous if these barriers are helical and extend continuously over the entire length of the screen. The device of the invention also includes means for discharging the foreign bodies separated from the liquid and deposited on the screen.

In order to clean the screen, it is advisable that within the screen a circulating flow is generated, by which the fibrous materials and the other solids deposited on the inside of the screen are reliably flushed toward the apex of the screen and are there carried away. The discharge means can comprise an adjustable throttle valve or flap disposed at the inlet end of the screen. The throttle valve is then used to block off the entire pipe line. It is also possible, however, that in the region of the inlet to the screen to provide at least one inlet disposed tangentially to the conduit for admitting flushing liquid into the conduit.

Furthermore, for cleaning the screen, a throttle valve can be mounted beyond the apex of the screen, whereby the main flow is largely shut off and the oncoming liquid alone is used for cleaning the screen.

In order to augment the cleaning action for the screen, it is a further feature of the invention to provide a ring line or conduit disposed on the outer surface of the screen and surrounding the screen in several turns. The ring conduit is equipped with corresponding nozzles for spraying a flushing liquid onto the surface of the screen. The separation of the solids from the inside surface of the screen is thereby aided.

For the intermittent removal of the collected solids, it is furthermore advantageous to provide a throttle valve mounted in the discharge tube for the separated solids.

Although the invention is illustrated and described herein as a device for separating solids and other foreign bodies from liquids in a pipe conduit, it is nevertheless not intended to be limited to the details shown, since various modifications may be made therein within the scope and the range of the claims. The invention, however, together with additional objects and advantages will be best understood from the following description and in connection with the accompanying drawings in which:

Figure 1:
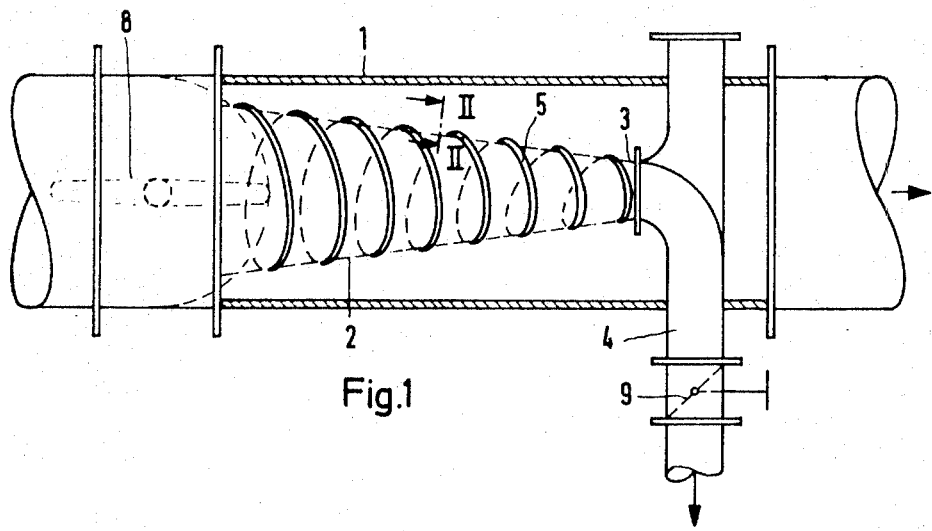
FIG. 1 illustrates, partially in section, a longitudinal view of a device separating solids according to the invention and equipped with a helically extending barrier on the surface of the screen.

According to FIG. 1, a conically tapered screen 2 is received in the pipe conduit 1. A conduit 4 extends from the apex 3 and leads to the outside for discharging the separated solids.

Figure 2:
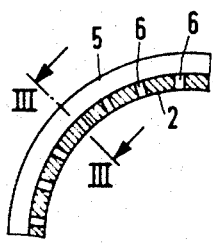
FIG. 2 is a cross-section view taken through a portion of the screen taken along line II—II of FIG. 1.
Figure 3:
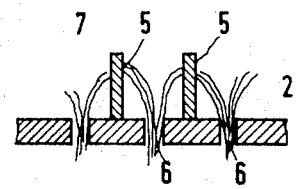
FIG. 3 is a longitudinal section through a portion of the screen illustrating the barrier taken along line III—III of FIG. 2.

According to an embodiment of the invention, a barrier is arranged on the outside of the screen 2 or side of the screen from which the liquid flows after foreign bodies have been lodged in the screen. The barrier extends helically and perpendicularly to the surface of the screen and transversely to the direction of the main liquid flow. The cross-section according to FIG. 2 illustrates the holes 6 and a view of the barrier 5. The function of these barriers is further explained with reference to FIG. 3 wherein the barriers 5 are depicted disposed always between each two mutually adjacent rows of holes 6, so that the direct connection between the hole outlet on the outer side of the screen 2 is interrupted. Fibrous impurities 7, indicated schematically, have become lodged in the holes 6 of the screen 2. Normally, these fibers 7 would get entangled with each other or form knots on the outer side of the screen 2, so that it would not be possible to pull these fibers back to the inner side of the screen. The barriers 5 prevent these fibers 7 from becoming entangled with each other.

For cleaning the screen, a throttle valve or flap 8 which is rotatable about an axis, can be built into the conduit 1 ahead of the inlet of the screen 2. If this throttle valve is set at an angle, a helical flow is generated in the region of the screen, whereby the foreign bodies deposited on the surface of the screen are reliably carried away and can be discharged to the outside through the conduit 4 at the apex of the screen. This cleaning action can take place continuously during operation or intermittently. For this purpose, there is arranged in the discharge pipe conduit 4, additionally, a further throttle valve 9 which, when adjusted to the inclined position, causes a spinning motion to be imparted to the entering liquid.

Figure 4:
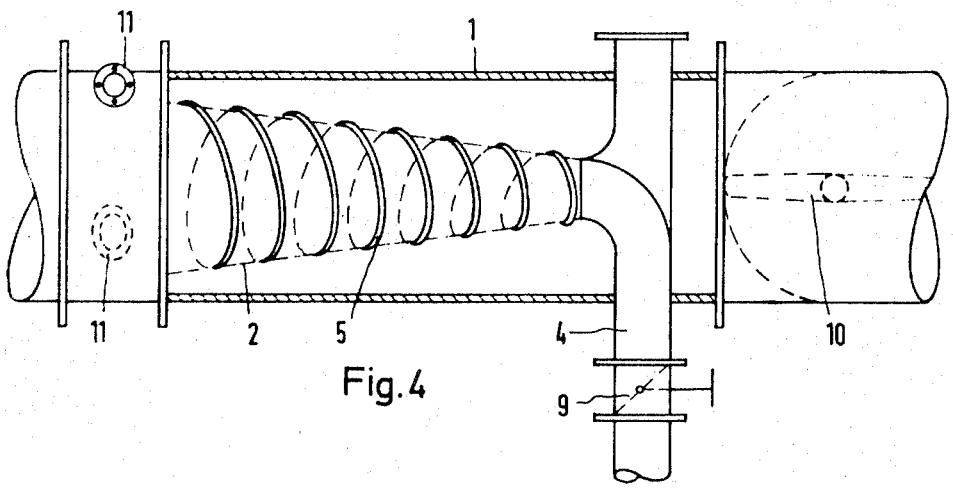
FIG. 4 is a longitudinal view, partially in section of a separating device according to the invention equipped with an inlet disposed tangentially to the conduit for admitting flush water.

A further possibility for cleaning the screen is shown in FIG. 4. Here, a throttle valve 10 is built in the pipe line 1 beyond the screen proper in downstream direction in order to substantially prevent the liquid from flowing out. In the region ahead of the screen 2, the pipe conduit 1 has inlet means in the form of one or several tangential pipe connections 11, through which a flushing liquid can be fed in. This flushing liquid then follows a helical path on the inner side of the screen and thereby carries the impurities settled there to the outside through the discharge connection 4.

Figure 5:
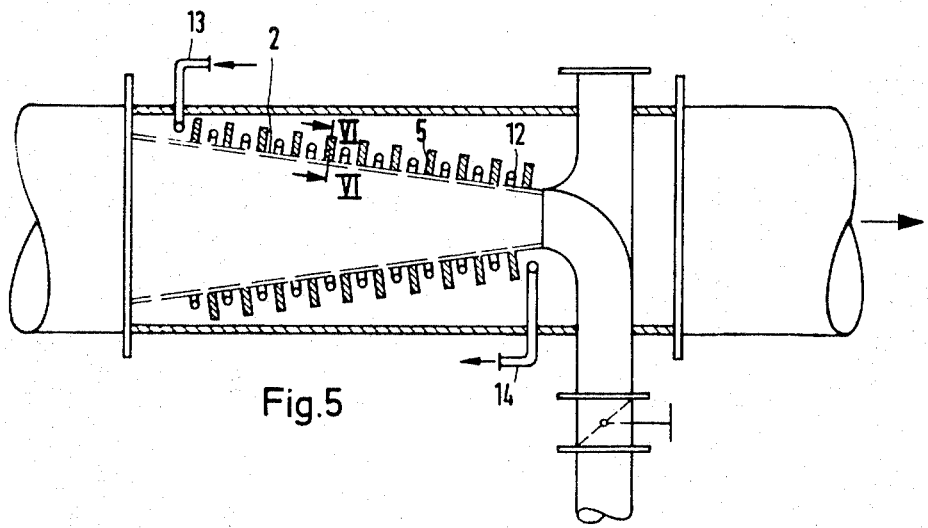
FIG. 5 is a longitudinal view, partially in section, of a device for separating solids from liquids having a conically tapered screen with a flush water ring line; and, FIG. 6 is a longitudinal view, partially in section, through the screen in device of FIG. 5 taken along line VI—VI.
Figure 6:
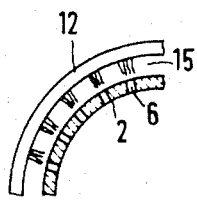

To aid the cleaning, the screen can, however, also be sprayed from the outside. For this purpose, a helical spray line 12 is arranged, according to FIG. 5, on the outer side of the screen 2 between the individual barrier portions 5. The helical spray line or ring-like conduit 12 has an inlet connector 13 and a flush water outlet connector 14. Referring to FIG. 6, this spray line 12 has spray openings or nozzles 15 on the inner side through which a flush liquid can be sprayed onto the surface of the screen. Because of the helical flow, provided also in this embodiment of the invention, for cleaning the screen on its inner side and produced by throttle valves not shown in detail, or produced by feeding in the flush water tangentially, a reliable cleaning of the screen also of fibrous substances is therefore assured by the spray of the flushing liquid.

It is therefore possible with the simple measures described, to use such screens to obtain a reliable separation of fibrous or flat solids and thereby largely avoid clogging of the screen by these foreign bodies. This means that these separating devices require practically no maintenance, as they can be reliably cleaned either continuously during the separation process or intermittently, without opening the pipe conduit and reaching in from the outside.

What is claimed is:

1. Device for separating solids and other foreign bodies from a liquid in a pipe conduit, comprising a conically-shaped screen receivable in a pipe conduit, said screen being formed with a plurality of rows of holes, said screen being disposed in the conduit so that the surface of said conically-shaped screen tapers downwardly in the direction of flow of a liquid through the conduit, said screen having an inlet opening at its upstream end in the flow direction for receiving liquid containing foreign bodies therein, so that at least a portion of the liquid passes through said holes of said screen leaving foreign bodies deposited on said screen, said screen having an outlet opening at its downstream end, means for discharging the foreign bodies separated from the liquid and deposited on the screen, and barrier means disposed on the outer side of said screen and extending perpendicularly to said screen between respective mutually adjacent rows of the holes in a direction transverse to the direction of flow of the liquid.

2. Device of claim 1, said barrier means being a single flange-like member extending helically over the entire length of said screen.

3. Device of claim 1, said discharge means comprising a throttle valve rotatably mounted at said inlet opening of said screen, said valve being rotatable so as to block the entire pipe conduit, and a discharge conduit connected to said outlet opening of said screen for directing the separated foreign bodies away from the pipe conduit.

4. Device of claim 1, said discharge means comprising a throttle valve mounted downstream beyond said outlet opening of said screen.

5. Device of claim 1, inlet means disposed tangentially to the conduit in the region of said inlet opening of said screen for admitting flushing liquid to said conduit for loosening foreign bodies lodged on said screen.

6. Device of claim 1, comprising a ring-like conduit for conducting flushing liquid therethrough disposed on the outer side of said screen and formed in several turns in surrounding relation to the surface of said screen, and nozzles in said ring-like conduit for spraying the flushing liquid flowing through the latter onto said surface of said screen.

7. Device of claim 1, said discharge means comprising a discharge conduit connected to said outlet opening of said screen for directing the separated foreign bodies away from the pipe conduit.

8. Device of claim 7, said discharge means comprising a throttle valve mounted in said discharge conduit.

* * * * *